United States Patent
Martone et al.

(10) Patent No.: US 10,609,570 B2
(45) Date of Patent: Mar. 31, 2020

(54) METHOD AND SYSTEM FOR OPTIMIZING NETWORK PARAMETERS TO IMPROVE CUSTOMER SATISFACTION OF NETWORK CONTENT

(71) Applicant: Accenture Global Services Limited, Dublin (IE)

(72) Inventors: Pietro Martone, Rome (IT); Emanuele Procaccioli, Rome (IT); Sushil Magan Ostwal, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 54 days.

(21) Appl. No.: 15/235,825

(22) Filed: Aug. 12, 2016

(65) Prior Publication Data

US 2017/0064569 A1 Mar. 2, 2017

(30) Foreign Application Priority Data

Aug. 31, 2015 (IN) ............................ 4568/CHE/2015

(51) Int. Cl.
*H04W 40/00* (2009.01)
*H04W 24/02* (2009.01)
(Continued)

(52) U.S. Cl.
CPC ......... *H04W 24/02* (2013.01); *H04L 41/0631* (2013.01); *H04L 41/5035* (2013.01);
(Continued)

(58) Field of Classification Search
CPC .. H04W 24/02; H04W 24/06; H04L 41/0631; H04L 41/5035; H04L 41/5067; H04L 43/0852; H04L 43/12; H04L 43/16
See application file for complete search history.

(56) References Cited

U.S. PATENT DOCUMENTS 6,829,491 B1 * 12/2004 Yea ....................... H04W 24/02
455/403
9,088,768 B1 * 7/2015 Bordner-Babayigit ....................
H04L 41/5067
(Continued)

FOREIGN PATENT DOCUMENTS

WO 2008107020 A1 9/2008

OTHER PUBLICATIONS

Search Report and Written Opinion for European Application No. 16 186 256.0, completed Nov. 30, 2016.

*Primary Examiner* — Amancio Gonzalez
(74) *Attorney, Agent, or Firm* — Brinks Gilson & Lione (57) ABSTRACT

A method for optimizing network parameters of a network includes receiving, via a network probe in communication with the network, a service type, key performance indicators associated with the service type, and network parameter information of the network. A customer satisfaction score associated with the service type and the associated key performance indicators is determined. When the customer satisfaction score is determined to be below a threshold, one or more network parameters leading to the customer satisfaction score being below the threshold are determined from the network parameter information. The one or more network parameters are adjusted, via a network configuration interface in communication with the network, to thereby increase the customer satisfaction score.

22 Claims, 8 Drawing Sheets

(51) Int. Cl.
*H04L 12/26* (2006.01)
*H04L 12/24* (2006.01)
*H04W 24/06* (2009.01)

(52) U.S. Cl.
CPC ...... *H04L 41/5067* (2013.01); *H04L 43/0852* (2013.01); *H04L 43/12* (2013.01); *H04L 43/16* (2013.01); *H04W 24/06* (2013.01)

(56) References Cited

U.S. PATENT DOCUMENTS

| | | | |
|---|---|---|---|
| 9,098,412 B1* | 8/2015 | Marchant | G06F 11/079 |
| 2010/0115605 A1* | 5/2010 | Beattie | H04L 12/5695 |
| | | | 726/15 |
| 2013/0051239 A1* | 2/2013 | Meredith | H04W 16/18 |
| | | | 370/241 |
| 2014/0068348 A1 | 3/2014 | Mondal et al. | |
| 2015/0106166 A1 | 4/2015 | Gutierrez et al. | |
| 2015/0127174 A1* | 5/2015 | Quam | H04L 67/12 |
| | | | 700/276 |
| 2015/0348065 A1* | 12/2015 | Doganata | G06Q 30/0202 |
| | | | 705/7.31 |
| 2016/0155076 A1* | 6/2016 | Fix | G06Q 10/06395 |
| | | | 705/7.39 |
| 2016/0226733 A1* | 8/2016 | Niemoeller | H04L 43/08 |

* cited by examiner

METHOD AND SYSTEM FOR OPTIMIZING NETWORK PARAMETERS TO IMPROVE CUSTOMER SATISFACTION OF NETWORK CONTENT

RELATED APPLICATIONS

This application claims priority under 35 U.S.C. § 119 to Indian Application No. 4568/CHE/2015, filed Aug. 31, 2015, the contents of which are hereby incorporated by reference in their entirety.

BACKGROUND

Field

This application generally relates to network systems that deliver customer content. In particular, this application describes a method and system for optimizing network parameters to improve customer satisfaction of the content.

Description of Related Art

Maximizing customer satisfaction is ordinarily a key goal for a network provider in the delivery of network content, such a web browsing, video streaming, voice-over-IP, etc. One way to accomplish this is to ensure the network is operating at peak performance so that the network does not become the "weak link" in the delivery of the content. For example, the network operator could continually upgrade equipment to increase network speeds and reduce network latency in an effort to keep up with the network demands imposed by delivery of the content.

However, ensuring that the network is always operating at peak performance necessarily comes with a cost. For example, providing top-notch equipment typically increases network expenses. Moreover, there may be lower cost solutions for improving customer experience. For example, changing equipment from one manufacturer to another may result in improved customer experience. Reducing the number of nodes between servers and customers, and increasing the signal strength of, for example, one or more cellular towers may result in improved customer experience.

In addition, customer satisfaction is a somewhat subjective measurement and current systems are unable to ascertain the customer satisfaction in real-time. Rather, negative customer satisfaction may be inferred when a customer decides to drop a service, switch carriers, etc. And by the time this occurs, it may be too late to change the mind of a customer.

BRIEF SUMMARY

In one aspect, a method for for optimizing network parameters of a network is provided. The method includes receiving, via a network probe in communication with the network, a service type, key performance indicators (KPIs) associated with the service type, and network parameter information of the network. A customer satisfaction score associated with the service type and the associated key performance indicators is determined. When the customer satisfaction score is determined to be below a threshold, one or more network parameters leading to the customer satisfaction score being below the threshold are determined from the network parameter information. The one or more network parameters are adjusted, via a network configuration interface in communication with the network, to thereby increase the customer satisfaction score.

In a second aspect, a system for optimizing network parameters of a network is provided. The system comprises a network probe, a score generator, a root-cause analyzer, and a network optimizer. The network probe is in communication with the network and is configured to receive a service type, key performance indicators associated with the service type, and network parameter information of the network. The score generator is configured to determine a customer satisfaction score associated with the service type and the associated key performance indicators. The root-cause analyzer is configured to determine, from the network parameter information, one or more network parameters leading to the customer satisfaction score being below the threshold when the customer satisfaction score is determined to be below the threshold. The network optimizer is in communication with a network configurator and is configured to communicate instructions for adjusting one or more of the identified network parameters to thereby increase the customer satisfaction score.

In a third aspect, a non-transitory machine-readable storage medium is provided. A computer program that includes a code section for optimizing network parameters of a network is stored on the non-transitory machine-readable. The code section is executable by a machine and causes the machine to receive a service type, key performance indicators associated with the service type, and network parameter information of the network; and to determine a customer satisfaction score associated with the service type and the associated key performance indicators. When the customer satisfaction score is determined to be below a threshold, the code section causes the machine to determine, from the network parameter information, one or more network parameters leading to the customer satisfaction score being below the threshold; and adjust one or more of the identified network parameters to thereby increase the customer satisfaction score.

DETAILED DESCRIPTION

To overcome the problems described above, various embodiments of a method and system for optimizing network parameters to improve customer satisfaction of network content are described below. Generally, the system is configured to receive service type information, key performance indicator information associated with the service type, and network parameter information. Next, the system converts key performance indicators into a customer satisfaction score. When the customer satisfaction score is below a threshold, the system determines parameters of the network that may be leading to the low customer satisfaction score. The system then communicates instructions for adjusting one or more of these parameters to one or more pieces of network equipment, which should, therefore, improve the customer satisfaction score.

The service type may specify the service to be a web browsing service, a video streaming service, email service, voice-over-IP service, etc. For example, the video streaming service may be YouTube®, Vimeo®, etc. The mail service may Gmail®, Hotmail®, etc. The web browsing service may be Google®, FaceBook®, etc.

The key performance indicators (KPIs) associated with a given service may correspond to metrics associated with the service that are provided by a network or service provider. Table 1 illustrates exemplary KPIs that may be measured for a given type of service.

TABLE 1

| Service Type | KPIs | Description |
| --- | --- | --- |
| Video | Presence of advertisement before content start | Verify presence of advertisement (yes/no) |
| Video | Initial re-buffering presence at advertisement start | Presence of advertisement buffering (yes/no) |
| Video | Initial re-buffering duration at advertisement start | Data download duration before advertisement starting |
| Video | Initial re-buffering presence at video start | Presence of Content buffering (yes/no) |
| Video | Initial re-buffering duration at video start | Data download duration before Content starting |
| Video | Presence of single/multiple freeze | Stop motion during a watch (yes/no) |
| Video | Number of stalls | Numeric values of freezes |
| Video | Server response time | Amount of time in seconds for content to begin |
| Video | Duration of stalls | Time of stop motion (in seconds) |
| Web Browsing | Presence of initial visualization delay | Objective Presence Page response time |
| Web Browsing | Duration in seconds of initial visualization delay | Objective Duration of Page response time (in seconds) |
| Web Browsing | Presence of complete page visualization | Objective Presence Page Visualization |
| Web Browsing | Duration in seconds of complete page visualization | Objective Duration Load Page Time (in seconds) |
| Web Browsing | Server Response Time | Time to Load Server |

The network parameter information may specify the manufacturer of network equipment, the specific model number of a piece of equipment, the service provider using the equipment, the type of cell tower being used to communicate information, network speed, network latency, network bandwidth, network signal strength, an amount of memory required by the equipment, a computation power of the equipment, etc. Other parameters of the network may be specified.

Figure 1:
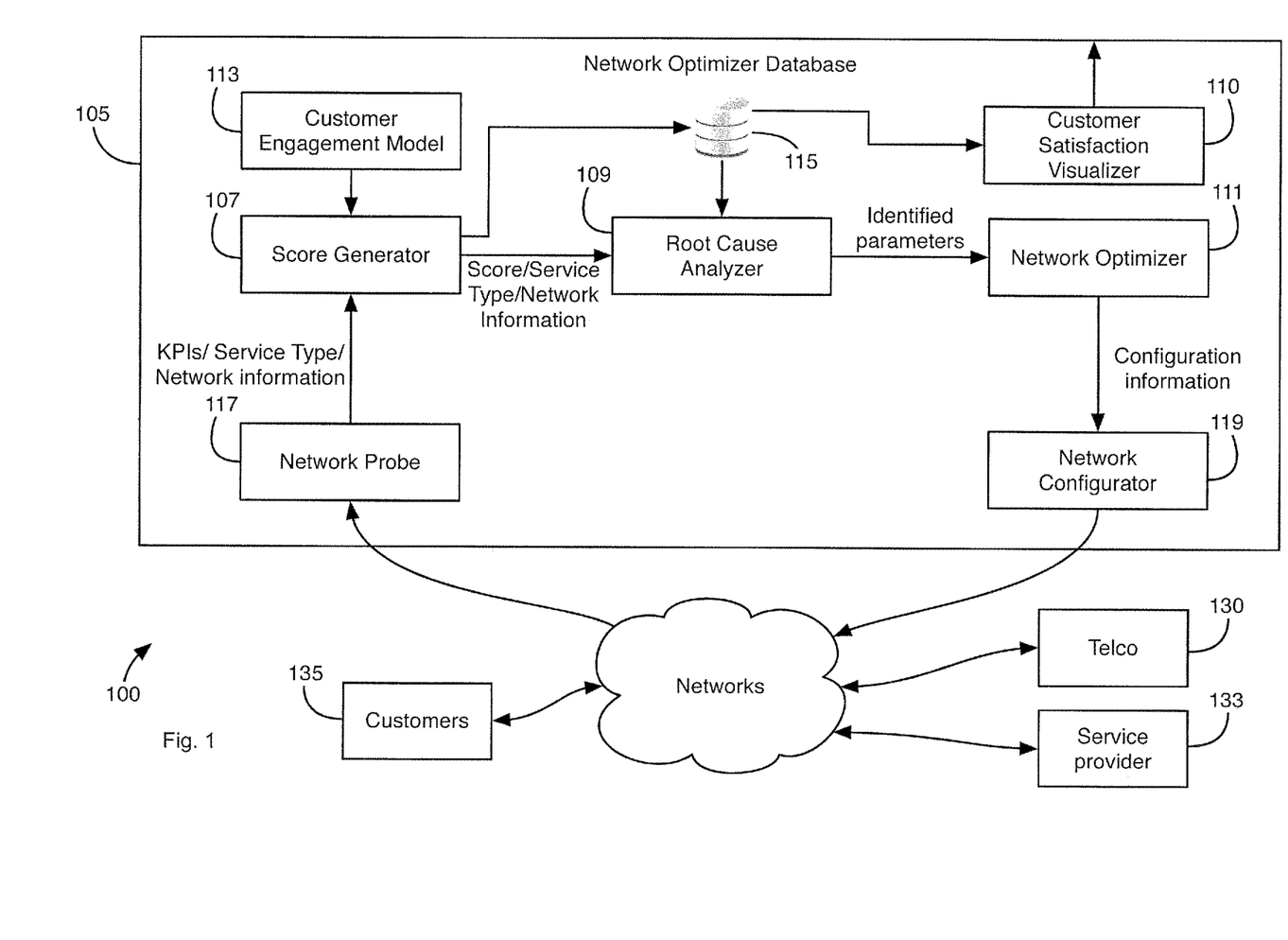
FIG. 1 illustrates an environment in which an exemplary system for optimizing network parameters to improve customer satisfaction may be provided.

FIG. 1 illustrates an environment 100 in which an exemplary system 105 for optimizing network parameters to improve customer satisfaction may be provided. The system includes 105 includes a score generator 107, a root-cause analyzer 109, a customer satisfaction visualizer 110, and a network optimizer 111. The system 105 also includes a customer engagement model 113, and a network optimizer database 115.

The environment 100 also includes a network probe 117 through which the system receives information about the network, and a network configurator 119 through which the system communicates configuration information for configuring the network.

The system 105 may correspond to one or more networked computer systems, each of which is configured to implement specific operations of the system 105. For example, the score generator 107 may correspond to a first computer system configured to generate a customer satisfaction score. The root-cause analyzer 109 may correspond to a second computer system configured to receive the score generated by the score generator 107 along with service type and network information, and to determine the reason why a particular network might have a low customer satisfaction score. The network optimizer 111 may correspond to a computer system configured to receive network parameters identified by the root-cause analyzer 109 as contributing to a low customer satisfaction score and to communicate commands for reconfiguring network parameters to increase the customer satisfaction score to the network configurator 119.

Each computer system may include a processor such as an Intel®, AMD®, or PowerPC® processor or a different processor that implements an IOS®, Android®, or Windows® operating system, or a different operating system. The processor may execute instruction code for implementing operations associated with a particular system. Each computer system may also include an application programming interface (API) to facilitate sending and receiving instructions to and from other computer systems.

Operations of the system are described below with reference to FIGS. 2-6. The illustrated operations may be performed by one or more of the computer systems described above. In alternative implementations, the operations may be implemented by a single computer system configured to carry out two or more of the operations described above. In this regard, instruction code for causing the respective processors to carry out the respective operations may be stored in one or more storage devices in communication with the respective processors.

Figure 2:
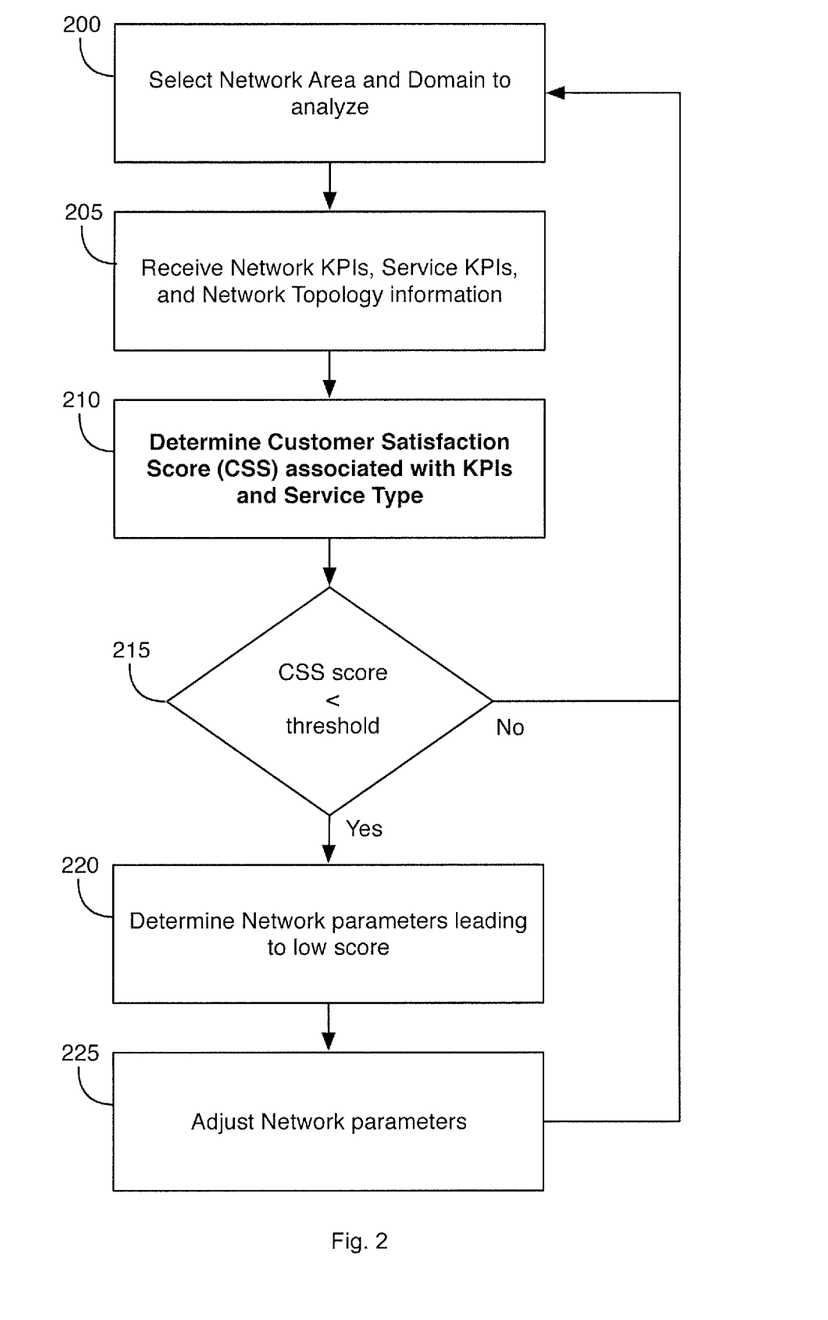
FIG. 2 illustrates an exemplary group of operations that may be performed by the system.

FIG. 2 illustrates a first exemplary group of operations that may be performed by the system 105. At block 200, the system 105 may select a network for an analysis. For example, the system 105 may select a network associated with a particular telecommunications network provider (telco) 133.

At block 205, the system may receive service type information, key performance information associated with the service type, and network information associated with the network. For example, the network probe 117 may request the information from the core network of the telco 133. The telco 133 may in turn communicate the information via the network to the network probe 117. Other methods may be utilized to receive some of this information. For example, over the top services (OTT) that utilize deep packing inspection (DPI) may be utilized to obtain some of the information.

At block 210, the system 105 determines a customer satisfaction score associated with the received information. For example, the score generator 107 may receive the service type information and the associated key performance indicators from the network probe 117, and generate a customer satisfaction score. The score generator 107 may determine the customer satisfaction score by processing the service type and the associated key performance indicators through a customer engagement model 113 that correlates these parameters to generate a customer satisfaction score.

Figure 3:
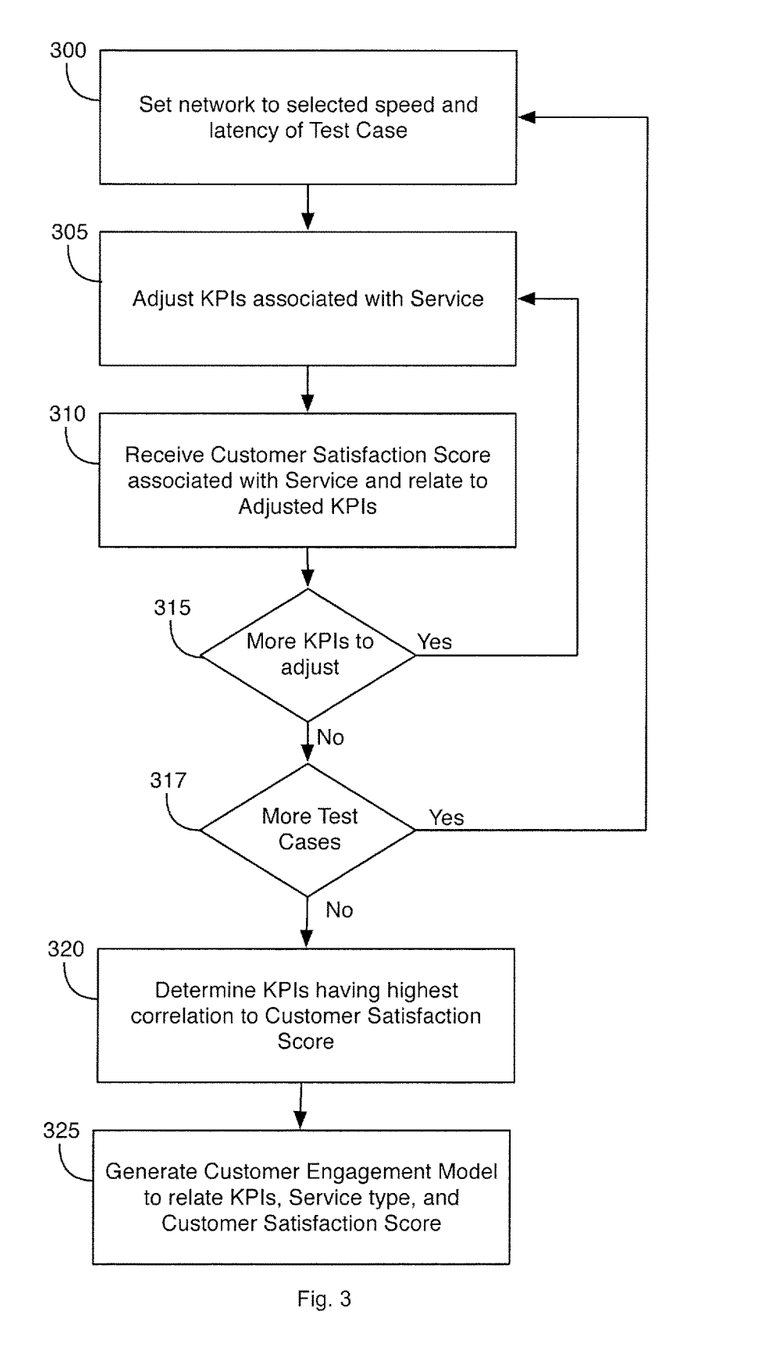
FIG. 3 illustrates an exemplary group of operations for generating a customer engagement model of the system.

FIG. 3 illustrates exemplary operations that may be performed to generate the customer engagement model 113. The customer engagement model is generated by soliciting customer feedback when the customers are viewing content in a controlled network environment. The customer feedback is in the form of a customer satisfaction score. Parameters of the network and KPIs associated with the content are varied during the testing to relate the customer satisfaction score with the KPIs associated with the content.

At block 300, a first test case may be selected. The test case may specify the network speed and latency of the network. Tables 2 and 3 illustrate exemplary test cases for video streaming services and web browsing services, respectively, that may be utilized in the generation of the customer engagement model. For example, in a first video streaming test case, the network bandwidth may be set to 5 Mbps with a latency of 0 ms. In a second video streaming test case, the network bandwidth may be set to 1.5 Mbps with a latency of 500 ms.

TABLE 2

| TC | Service | Bandwidth (Mbps) | Delay (ms) |
| --- | --- | --- | --- |
| 1 | Video streaming | 5 | 0 |
| 2 | Video streaming | 1.5 | 500 |
| 3 | Video streaming | 0.5 | 250 |
| 4 | Video streaming | 3 | 0 |
| 5 | Video streaming | 1 | 250 |
| 6 | Video streaming | 1.5 | 0 |
| 7 | Video streaming | 0.5 | 0 |
| 8 | Video streaming | 5 | 500 |
| 9 | Video streaming | 1 | 0 |
| 10 | Video streaming | 3 | 500 |

TABLE 3

| TC | Service | Bandwidth (Mbps) | Delay (ms) |
| --- | --- | --- | --- |
| 1 | Web Browsing | 3 | 0 |
| 2 | Web Browsing | 0.5 | 500 |
| 3 | Web Browsing | 1.5 | 250 |
| 4 | Web Browsing | 0.5 | 250 |
| 5 | Web Browsing | 3 | 750 |
| 6 | Web Browsing | 1.5 | 750 |
| 7 | Web Browsing | 3 | 250 |
| 8 | Web Browsing | 0.5 | 0 |
| 9 | Web Browsing | 1.5 | 0 |

At block 305, the KPIs associated with the service being viewed by the customer may be adjusted. The KPIs may correspond to those described above in Table 1. For example, an advertisement may be displayed before streaming video content. An initial buffering delay may be introduced prior to playing the video content. Streaming video content may be stalled for varying amounts of time. In the case of a web browsing session, the amount of time it takes before the webpage begins to display may be varied. The amount of time it takes for the webpage to fully display may be varied.

At block 310, a customer score may be received. For example, for each test case, and each set of adjusted KPIs, the customer may fill out a questioner to indicate his satisfaction with the service being viewed. For example, the questionnaire may ask the customer to rate his experience on a scale of zero to ten, with a score of ten corresponding to the highest satisfaction and zero corresponding to the lowest satisfaction. The granularity of the scoring may be different to provided greater customer satisfaction detail. The customer satisfaction score may be then be associated with the adjusted KPIs.

At block 315, if there are more KPI permutations or combinations to process, the next combinations of KPIs may be selected at block 305. These operations repeat until all the KPI permutations have been evaluated.

At block 317, if there are more test cases to process, the next test case may be selected at block 300. These operations repeat until all the test cases have been evaluated.

At block at 320, after the test cases have been evaluated, the customer satisfaction scores may be clustered into groups. For example, the scores may be grouped by quartiles. The first quarter quartile may reflect detractors (i.e., scores that indicate dissatisfaction with the service experience). The second and third quartiles make correspond to neutrals (i.e., scores that indicate satisfaction the service experience). The fourth quartile may reflect promoters (i.e., scores that indicate a higher level of satisfaction with the service experience). In one implementation, detractors may correspond to scores between zero and six. Neutrals may correspond to scores between nine and six. And promoters may correspond to scores between nine and ten.

After clustering the customer satisfaction scores into groups, the KPIs having the highest correlation to the customer satisfaction score may be determined. For example, a linear regression model or other similar statistical model may be utilized to determine the KPIs having the highest correlation with the customer satisfaction scores.

At block 325, the customer engagement model is generated based on the the service type, the customer satisfaction score, and those KPIs that are most correlated with the customer satisfaction score. In some implementations, each service type is associated with a different customer engagement model. For example, a first customer engagement model may be associated with web browsing services and a second customer engagement model may be associated with video streaming services. In addition, or alternatively, specific services of a service type may be associated with different customer engagement models. For example, a specific customer engagement model may be associated with a web service such as Facebook®. A different customer engagement model may be associated with a web service such as Google®.

The customer engagement model is configured to receive as input the most relevant KPIs associated with the service type or specific service and to output a score, such a 3 to indicate a high degree of satisfaction, 2, to indicate a medium degree of satisfaction, and 1 to indicate a low degree of satisfaction. Other types of score are possible.

Figure 4A:
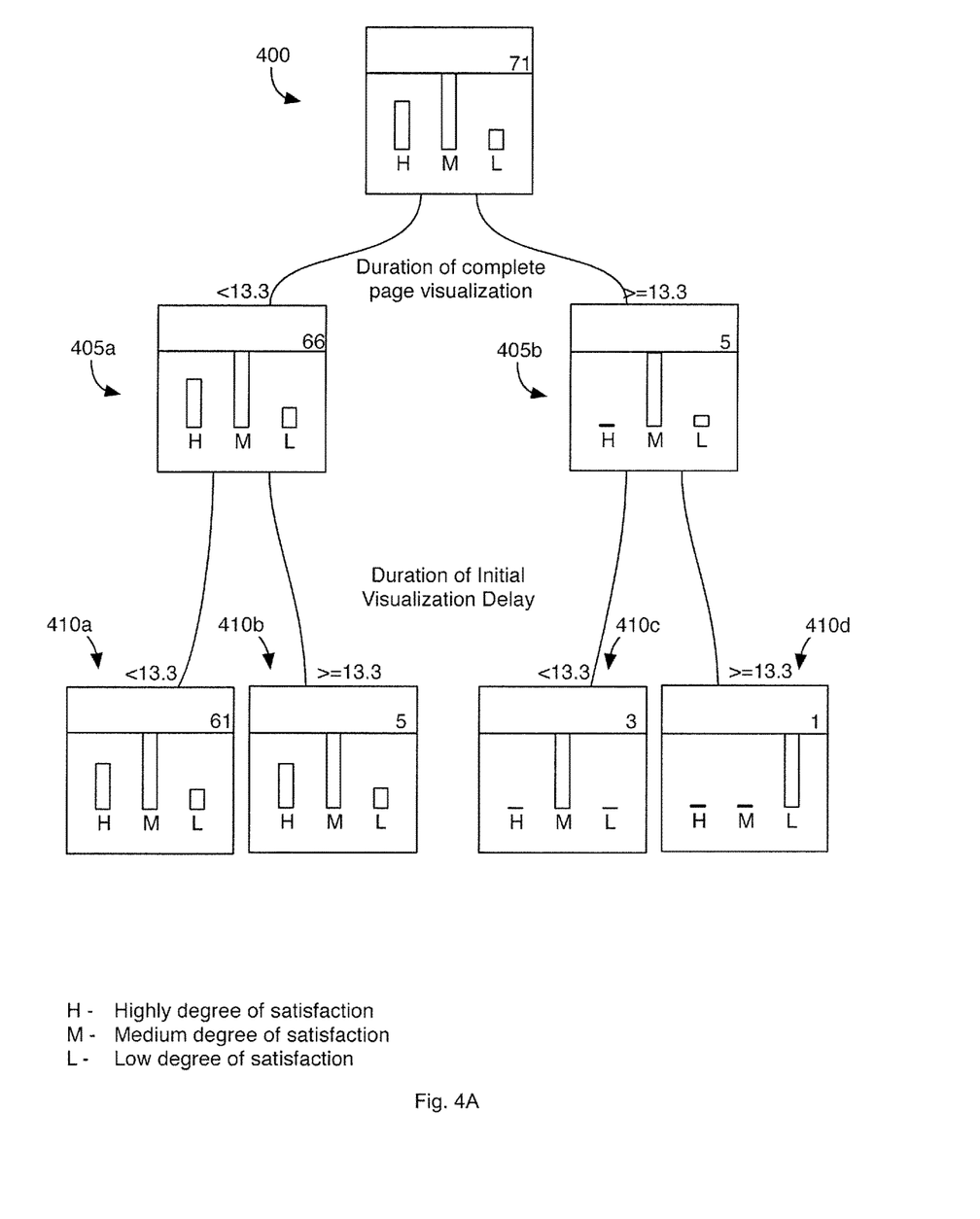
FIG. 4A illustrates an exemplary decision tree that may form the basis of the customer engagement model for a web browsing service.

FIG. 4A illustrates an exemplary decision tree that may form the basis of the customer engagement model associated with all web browsing services, or with a specific web browsing service, such a Google®, Facebook® etc. In the exemplary decision tree, the KPIs determined to have the highest correlation with the customer satisfaction score were determined to be those KPIs associated with the duration of initial visualization delay and the presence of complete page visualization.

The top level node 400 of the tree indicates a total of 73 customer satisfaction score samples that are distributed between high (H), medium (M), and low (L) scores. The second level nodes 405*ab* illustrate the distribution when the duration of complete page visualization is less than 13.3 s (405*a*) and greater than or equal to 13.3 s (405*b*), respectively. The third level nodes 410*a-d* illustrate the distribution when the duration of an initial visualization display is less than 13.3 s (410*ac*) and greater than or equal to 13.3 s (410*bd*), respectively. As illustrated, the greatest number of customer satisfaction scores, 66 in all, falls within node 410*a*. Node 410*a* indicates that when the duration of initial visualizations delay value is less than 13.3 s and the duration of complete page visualization value is less than to 13.3 s, the score should indicate a medium to high degree of satisfaction. Node 410*b* indicates that when the duration of initial visualizations delay value is greater than or equal to than 13.3 s and the duration of complete page visualization value is less than 13.3 s, the score should indicate a medium degree of satisfaction. Node 410*c* indicates that when the duration of initial visualizations delay value is less than or 13.3 s and the duration of complete page visualization value is greater than or equal to 13.3 s, the score should indicate a medium degree of satisfaction. Node 410*d* indicates that when the duration of initial visualizations delay value is less than 13.3 s and the duration of complete page visualization value is greater than or equal to 13.3 s, the score should indicate a low degree of satisfaction.

The decision tree may be partially represented as a series of conditional statements. For example, the decision tree of FIG. 4 may be represented by the following conditional statements:

If (duration of initial visualization delay<13.3 s) and (duration of complete page visualization<13.3 s) then KPI values correspond to a customer satisfaction score indicative of a medium degree of satisfaction.

If (duration of initial visualization delay>=13.3 s) and (duration of complete page visualization<13.3 s) then KPI values correspond to a customer satisfaction score indicative of a medium degree of satisfaction.

If (duration of initial visualization delay<13.3 s) and (duration of complete page visualization>=13.3 s) then KPI values correspond to a customer satisfaction score indicative of a medium degree of satisfaction.

If (duration of initial visualization delay>=13.3 s) and (duration of complete page visualization>=013.3 s) then KPI values correspond to a customer satisfaction score indicative of a low degree of satisfaction.

Figure 4B:
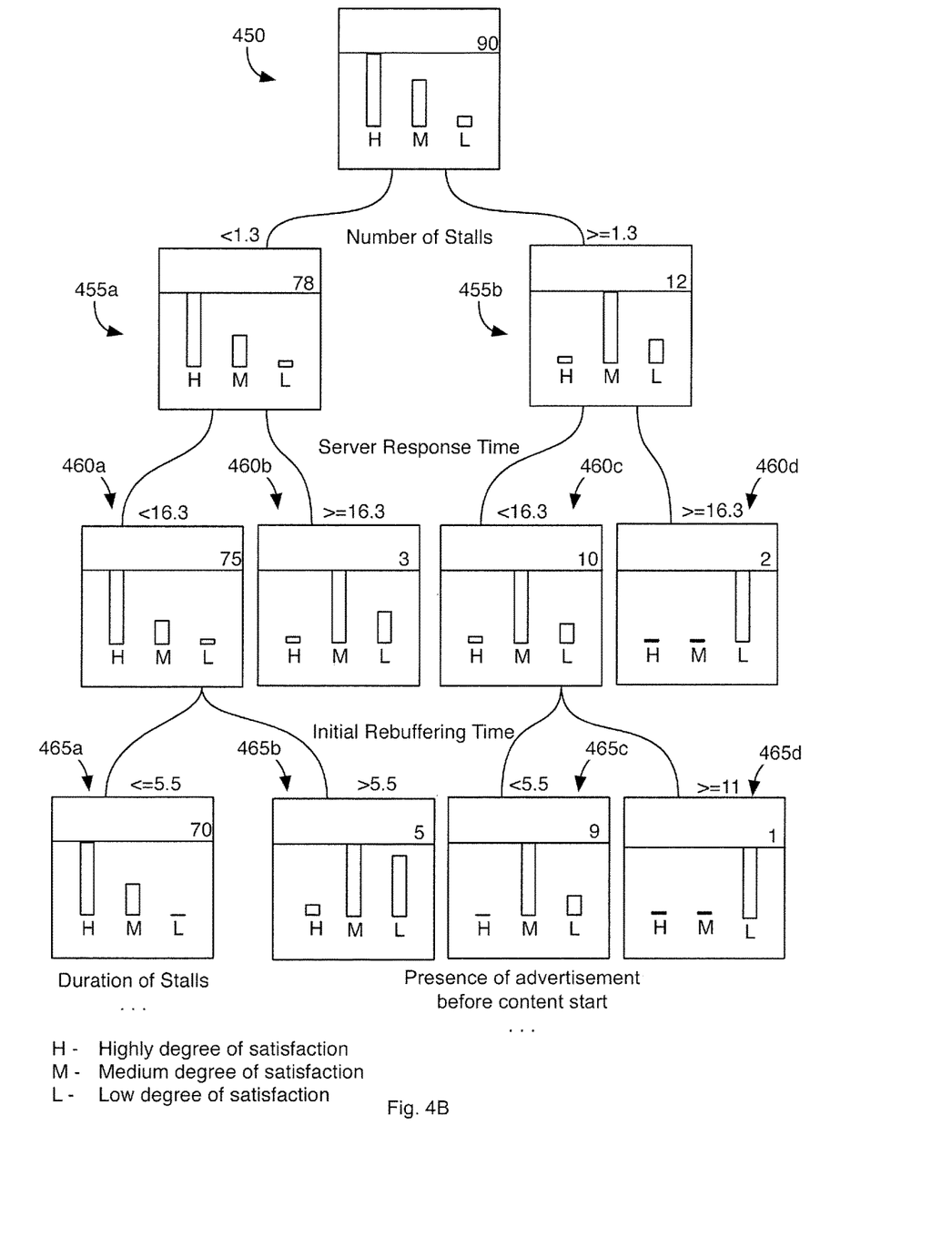
FIG. 4B illustrates an exemplary decision tree that may form the basis of the customer engagement model for a video streaming service.

FIG. 4B illustrates an exemplary decision tree that may form the basis of the customer engagement model associated with all video streaming services, or with a specific video streaming service, such a Youtube®, Vimeo® etc. In the exemplary decision tree, the KPIs determined to have the highest correlation with the customer satisfaction score were determined to be those KPIs associated with the number of stalls, the server response time, the initial re-buffering, the duration of stalls, and whether there was an advertisement present at the start of content delivery.

The top level node 450 of the tree indicates a total of 90 customer satisfaction score samples that are distributed between high (H), medium (M), and low (L) scores. The second level nodes 455*ab* illustrate the distribution when the number of stalls is less than 1.3 s (455*a*) and greater than or equal to 1.3 s (455*b*), respectively. The third level nodes 410*a-d* illustrate the distribution when the server response time is less than 16.3 s (460*ac*) and greater than or equal to 16.3 s (410*bd*), respectively. The fourth level nodes 410*a-d* illustrate the distribution when the initial re-buffering time is less than 5.5 sand greater than or equal to 11 s (465*a*), greater than or equal to 5.5 s and less than 11 s (465*b*), and less than 5.5 s (465*c*), and greater than or equal to 11 s (410*d*), respectively. Additional nodes corresponding to other KPIs determined to be highly correlated with customer satisfaction may be added. For example, nodes representing KPIs associated with the duration of stalls and the presence of an advertisement before content start may be added.

As illustrated, the greatest number of customer satisfaction scores, 70 in all, falls within node 465*a*. Node 465*a* indicates that when the number of stalls value is less than 1.3 s, the server response time value is less than 16.3 s, and the initial re-buffering time value is less than or equal to 5.5 s, the score should indicate a high degree of satisfaction. Node 465*b* indicates that when the number of stalls value is less than 1.3 s, the server response time value is less than 16.3 s, and the initial re-buffering time value is greater than 5.5 s, the score should indicate a medium degree of satisfaction. Node 465*c* indicates that when the number of stalls value is greater than or equal to 1.3 s, the server response time value is less than 16.3 s, and the initial re-buffering time value is less than 5.5 s, the score should indicate a medium degree of satisfaction. Node 465*d* indicates that when the number of stalls value is greater than or equal to 1.3 s, the server response time value is less than 16.3 s, and the initial re-buffering time value is greater than 11 s, the score should indicate a low degree of satisfaction. Node 460*d* indicates that when the number of stalls value is greater than or equal to 1.3 s and the server response time value is greater than or equal to 16.3 s, the score should indicate a low degree of satisfaction.

The decision tree associated with video streaming may, for example, be partially represented as a series of conditional statements such as:

If (Number of Stalls<2) AND (Server Response Time<16 s) AND (Initial Rebuffering<6 s) AND (Duration of Stalls<25) then KPI values correspond to a customer satisfaction score indicative of a high degree of satisfaction.

If (Number of Stalls<2) AND (Server Response Time<16 s) AND (Initial Rebuffering<6 s) then KPI values correspond to a customer satisfaction score indicative of a medium degree of satisfaction.

If (Number of Stalls<2) AND (Server Response Time>=16 s) then KPI values correspond to a customer satisfaction score indicative of a medium degree of satisfaction.

If (Number of Stalls>=2) AND (Server Response Time<16 s) AND (Initial Rebuffering<6 s) then KPI values correspond to a customer satisfaction score indicative of a low degree of satisfaction.

If (Number of Stalls>=2) AND (Server Response Time>=16 s OR Initial Rebuffering>=11 s) then KPI values correspond to a customer satisfaction score indicative of a low degree of satisfaction.

Other models may be utilized to form the basis of the customer engagement model. For example, a second linear regression model with inputs corresponding to the most relevant KPIs may form the basis of the customer engagement model.

Returning to block 210 of FIG. 2, after determining the score, the score generator 107 may communicate the service type, the customer satisfaction score associated with the service type, and the associated network information to both the network optimizer database 115 and the root-cause analyzer 109. Table 4 illustrates exemplary records that may be stored in the network optimizer database 115.

TABLE 4

| Service type | Service | Network parameters | Customer Satisfaction Score |
|---|---|---|---|
| Web browsing | Google ® | Parameter set 1 | 3 |
| Web browsing | Google ® | Parameter set 2 | 2 |
| Web browsing | Google ® | Parameter set 3 | 1 |
| ... | ... | ... | ... |
| Video Streaming | YouTube ® | Parameter set 7 | 3 |
| Video Streaming | YouTube ® | Parameter set 8 | 2 |
| Video Streaming | YouTube ® | Parameter set 9 | 1 |
| ... | ... | ... | ... |

The service type column specifies whether the service is a web browsing service, video streaming service, voice-over-IP service, etc. The service column specifies the specific service, such as Google®, YouTube®, Vimeo®, Hotmail®, etc. The network parameters column specifies a combination of network parameters associated with the record, such as the network speed, network latency, network equipment manufacturer, equipment model number, telco provider, etc. The customer satisfaction score column specifies the score associated with the service/service type when using the corresponding network parameters defined in the network parameter set.

It should be noted that while the table only illustrates one network parameter set as having a corresponding customer satisfaction score of 3 for web browsing and one network parameter as having a customer satisfaction score of 3 for video streaming, etc., there may be many different combinations of parameters (i.e., a multitude of parameters sets) associated with customer satisfaction scores of 3, 2, and/or 1.

At block 215, if the customer satisfaction score is greater than a threshold, then it may be assumed that no parameters of the associated network need to be adjusted. For example, if the score indicates a high degree of satisfaction or a medium degree of satisfaction then it may not be necessary to change any of the associate network parameter. In this case, the operations continue from block 200 where the next network is selected for analysis.

If at block 215, the customer satisfaction score is determined to be below the threshold, such as a score indicating low satisfaction, then at block 220, network parameters associated with the network that lead to the low score may be determined by the root-cause analyzer 109.

Figure 5:
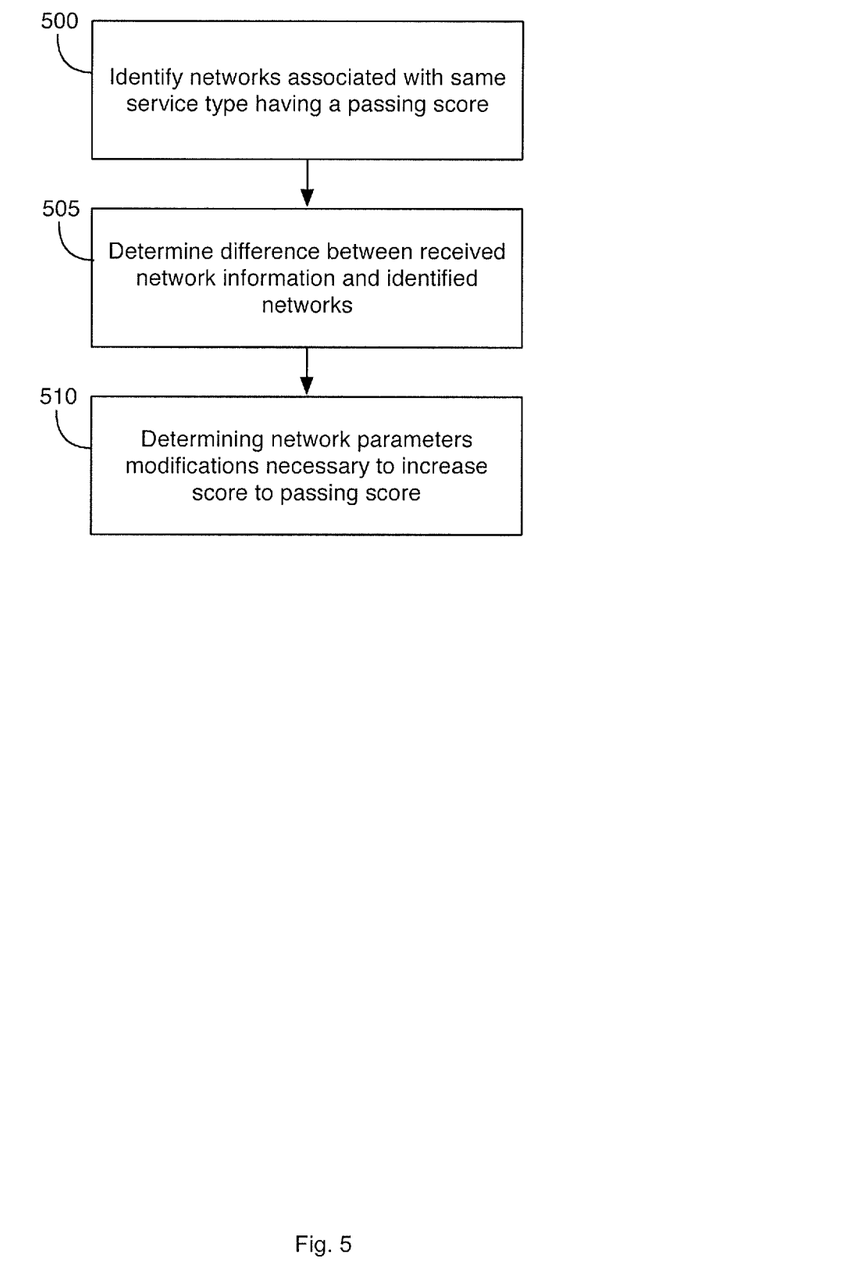
FIG. 5 illustrates an exemplary group of operations for identifying network parameters to adjust to improve a customer satisfaction score.

FIG. 5 illustrates exemplary operations that may be performed by the root-cause analyzer 109 and the network optimizer 111 in identifying the network parameters leading to a low score and for selecting network parameters for adjustment.

At block 500, networks associated with the same service type that have a passing score may be identified. For example, the root-cause analyzer 109 may select records of the network optimizer database 115 related to the received service type that are related to a customer satisfaction scores that are above the threshold.

At block 505, the differences between the network information received at block 205 and the network information associated with the records identified at block 500 may be determined. For example, parameters of the network information being compared may include the manufacturer of the network equipment, the specific model number of the equipment, the service provider using the equipment, the type of cell tower being used to communicate information, the speed and latency of the network, the bandwidth of the network, the amount of memory required by the network equipment, the computational power of the network equipment, etc. Other parameters of the network may be compared. The network parameter differences may be communicated from the root-cause analyzer 109 to the network optimizer 111.

At block 510, the network optimizer 11 may then target one or more of the identified network parameters for modification to facilitate improving the customer satisfaction score.

Returning to FIG. 2, at block 225, the network parameters targeted for adjustment may be communicated to the network configurator 119. For example, network parameters, such as those controlling network speeds and latency, may be communicated to the network configurator. The network configurator may in turn communicate the information to the telco 130, which may in turn send instructions to network equipment for adjusting the parameters.

In other implementations, the network optimizer 111 may generate a list of network parameters that require adjustment. The list may be communicated to the telco 130 for processing. For example, the list may indicate that a particular type of equipment should be changed from one manufacturer to another. In this case, the telco 130 might be inclined to swap out the equipment to improve the customer satisfaction score.

Figure 6:
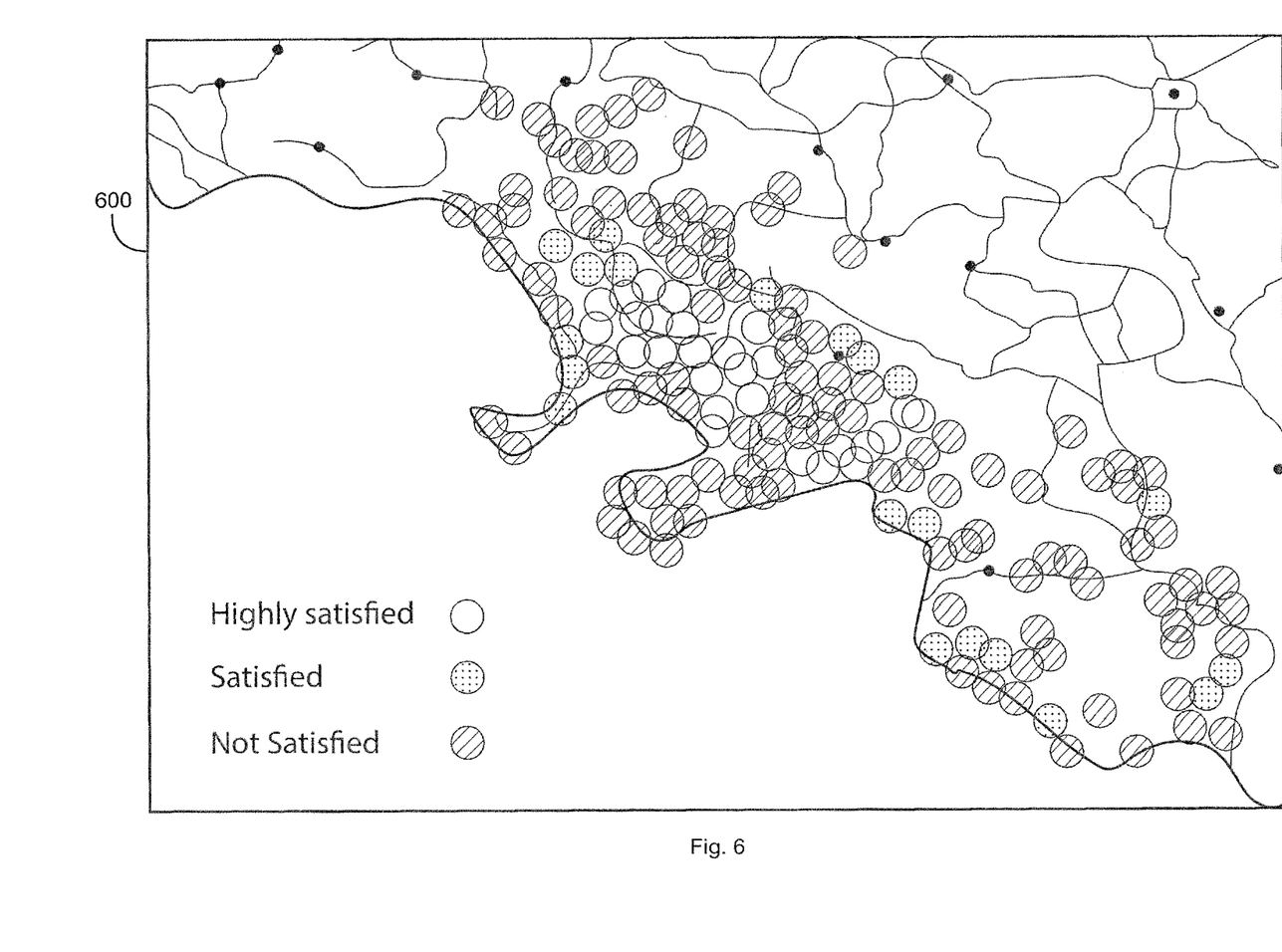
FIG. 6 illustrates an exemplary customer satisfaction score map that may be generated by a customer satisfaction visualizer of the system.

Some implementations of the system may include a customer satisfaction visualizer 110 configured to allow visualization of the customer satisfaction scores on a map, such as the map illustrated in FIG. 6. The visualizer 110 may correspond to a computer server configured to generate webpages for displaying customer satisfaction maps. The visualizer 110 may be in communication with the network optimizer database.

FIG. 6 illustrates an exemplary map 600 that may be generated by the visualizer 110. The map 600 illustrates geographic regions where customers are either highly satisfied, satisfied, or not satisfied. The map 600 allows a telco 130 to better understand how customer service is perceived in different geographic areas. This in turn allows the telco 130 to focus efforts on improving the network to those areas where customers are not satisfied rather than those areas where customers are already satisfied or highly satisfied.

Figure 7:
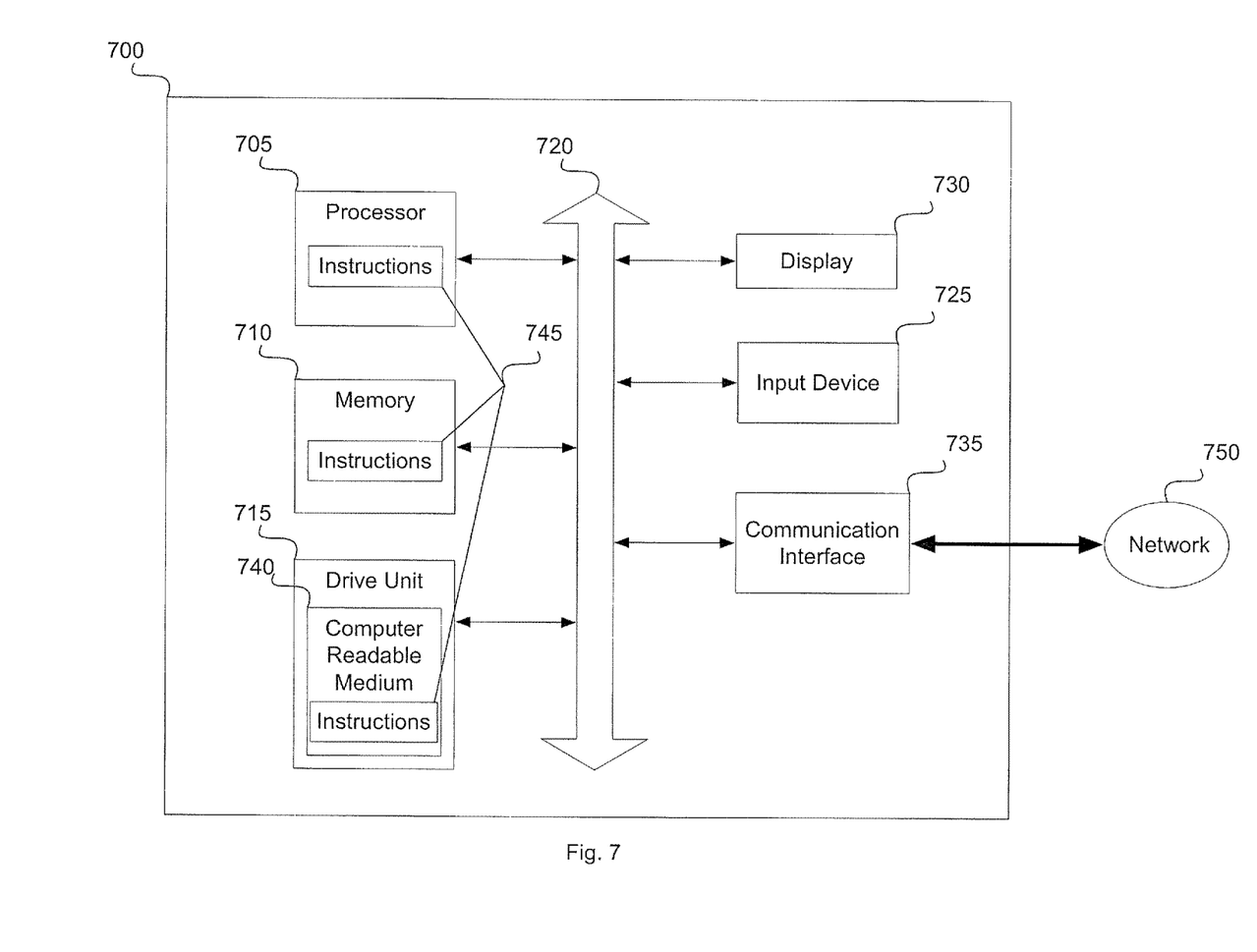
FIG. 7 illustrates a computer system that may correspond to one or more subsystems of the system.

FIG. 7 illustrates a computer system 700 that may form part of or implement the system 105 such as the the score generator 107, the root-cause analyzer 109, the customer satisfaction visualizer 110, the network optimizer 111, and/or any other module referenced herein. The computer system 700 may include a set of instructions 745 that the processor 705 may execute to cause the computer system 700 to perform any of the operations described above. The computer system 700 may operate as a stand-alone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile device, capable of executing the instructions 745 (sequential or otherwise) that specify actions to be taken by that machine. Further, each of the systems described may include any collection of subsystems that individually or jointly execute a set, or multiple sets, of instructions to perform one or more computer functions.

The computer system 700 may include one or more memory devices 710 on a bus 720 for communicating information. In addition, code operable to cause the computer system to perform any of the operations described above may be stored in the memory 710. The memory 710 may be a random-access memory, read-only memory, programmable memory, hard disk drive or any other type of memory or storage device.

The computer system 700 may include a display 730, such as a liquid crystal display (LCD), a cathode ray tube (CRT), or any other display suitable for conveying information. The display 730 may act as an interface for the user to see the functioning of the processor 705, or specifically as an interface with the software stored in the memory 710 or in the drive unit 715.

Additionally, the computer system 700 may include an input device 725, such as a keyboard or mouse, configured to allow a user to interact with any of the components of system 700.

The computer system 700 may also include a disk or optical drive unit 715. The disk drive unit 715 may include a computer-readable medium 740 in which the instructions 745 may be stored. The instructions 745 may reside completely, or at least partially, within the memory 710 and/or within the processor 705 during execution by the computer system 700. The memory 710 and the processor 705 also may include computer-readable media as discussed above.

The computer system 700 may include a communication interface 735 to support communications via a network 750. The network 750 may include wired networks, wireless networks, or combinations thereof. The communication interface 735 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for optimizing network parameters of a network, the method comprising:
   receiving, via a network probe in communication with the network, a service type, key performance indicators associated with the service type, and network parameter information of the network;
   receiving, from a customer engagement model, data that relates a customer experience to different combinations of service types, specific services provided by specific third party providers associated with the services types, and key performance indicator values, the data being based on feedback provided by customers when utilizing each of the different combinations of service types and specific services provided by specific third party providers associated with the services types with key performance indicators set to predetermined values;
   determining, based at least in part on the customer engagement model, a customer satisfaction score associated with the service type, the specific services provided by specific third party providers and the associated key performance indicators;
   when the customer satisfaction score is determined to be below a threshold, determining, from the network parameter information, one or more network parameters leading to the customer satisfaction score being below the threshold; and
   adjusting, via a network configuration interface in communication with the network, the one or more of the network parameters to thereby increase the customer satisfaction score.

2. The method according to claim 1, wherein the one or more network parameters that are adjusted correspond to parameters previously determined to be associated with customer satisfactions scores higher than the determined customer satisfaction score.

3. The method according to claim 1, wherein generation of the customer engagement model comprises:
   generating a plurality of network test cases, in which each test case specifies network parameters that include a network speed and a network latency;

consecutively setting test bed network parameters of a test bed network to the network parameters of each network test case;

for each test case, selecting a plurality of service types;

for each service type:
communicating, via the test bed network, content of the service type from a server to one or more customers;
adjusting a plurality of key performance indicators associated with the content; and
receiving, from the one or more customers, a customer satisfaction score that defines a quality of the content as perceived by the user.

4. The method according to claim 3, wherein after the customer satisfaction scores associated with the plurality network test cases, the plurality of service types, the specific services provided by specific third party providers and the plurality of key performance indicators have been received, the method further comprises determining a subset of key performance indicators having a highest correlation to the customer satisfaction score.

5. The method according to claim 1, wherein determination of the one or more network parameters leading to the customer satisfaction score being below the threshold comprises:

storing, to a network optimizer database, data that relates a plurality of customer satisfaction scores, one or more service types, the specific services provided by specific third party providers and one or more combinations of network parameters;

selecting records of the network optimizer database related to the received service type and the specific services provided by specific third party providers that are related to a customer satisfaction score that is above the threshold;

comparing network parameters of the selected records with the received network parameter information to identify network parameter differences between one or more network parameters defined in the network parameter information and the network parameters specified in the selected records; and determining that the network parameter differences lead to the customer satisfaction score being below the threshold.

6. The method according to claim 1, wherein a service type corresponds to at least one of: a video streaming type of service and a web browsing type of service.

7. The method according to claim 1, wherein the network parameter information defines one or more of: a cell name, a manufacturer of network equipment, a model of network equipment, a service provider associated with the network equipment model, an amount of memory required by the network equipment, and a computational power of the network equipment.

8. The method according to claim 1, further comprising generating, by a customer satisfaction visualizer, a map that illustrates customer satisfaction scores associated with different geographic regions.

9. A system for optimizing network parameters of a network, the system comprising:

a network probe in communication with the network configured to receive a service type, key performance indicators associated with the service type, and network parameter information of the network;

a database that includes a customer engagement model that relates a customer experience to different combinations of service types, specific services provided by specific third party providers associated with the services types, and key performance indicator values, the data being based on feedback provided by customers when utilizing each of the different combinations of service types and specific services provided by specific third party providers associated with the services types with key performance indicators set to predetermined values;

a score generator configured to determine, based at least in part on the customer engagement model, a customer satisfaction score associated with the service type the specific services provided by specific third party providers and the associated key performance indicators;

a root-cause analyzer configured to determine, from the network parameter information, one or more network parameters leading to the customer satisfaction score being below the threshold when the customer satisfaction score is determined to be below a threshold; and a network optimizer in communication with a network configurator configured to communicate instructions for adjusting the one or more of the network parameters to thereby increase the customer satisfaction score.

10. The system according to claim 9, wherein in generating the model, the system is configured to;

generate a plurality of network test cases, in which each test case specifies network parameters that include a network speed and a network latency;

consecutively set test bed network parameters of a test bed network to the network parameters of each network test case;

for each test case, select a plurality of service types;

for each service type:
communicate, via the test bed network, content of the service type from a server to one or more customers;
adjust a plurality of key performance indicators associated with the content; and
receive, from the one or more customers, a customer satisfaction score that defines a quality of the content as perceived by the user.

11. The system according to claim 10, wherein after the customer satisfaction scores associated with the plurality network test cases, the plurality of service types, the specific services provided by specific third party providers and the plurality of key performance indicators have been received, the score generator determines a subset of key performance indicators having a highest correlation to the customer satisfaction score.

12. The system according to claim 9, wherein in determining the one or more network parameters leading to the customer satisfaction score being below the threshold comprises:

the score generator stores, to a network optimizer database, data that relates a plurality of customer satisfaction scores, one or more service types, the specific services provided by specific third party providers and one or more combinations of network parameters;

the root-cause analyzer:
selects records of the network optimizer database related to the received service type and the specific services provided by specific third party providers that are related to a customer satisfaction score that is above the threshold;
compares network parameters of the selected records with the received network parameter information to identify network parameter differences between one or more network parameters defined in the network parameter information and the network parameters specified in the selected records; and determines that the network parameter differences lead to the customer satisfaction score being below the threshold.

13. The system according to claim 9, wherein a service type corresponds to at least one of: a video streaming type of service and a web browsing type of service.

14. The system according to claim 9, wherein the network parameter information defines one or more of: a cell name, a manufacturer of network equipment, a model of network equipment, a service provider associated with the network equipment model, an amount of memory required by the network equipment, and a computational power of the network equipment.

15. The system according to claim 9, wherein the system further comprises a customer satisfaction visualizer configured to generate a map that illustrates customer satisfaction scores associated with different geographic regions.

16. A non-transitory machine-readable storage medium having stored thereon a computer program comprising at least one code section for optimizing network parameters of a network, the at least one code section being executable by a machine for causing the machine to perform acts of:
receiving a service type, key performance indicators associated with the service type, and network parameter information of the network;
receiving, from a customer engagement model, data that relates a customer experience to different combinations of service types, specific services provided by specific third party providers associated with the services types, and key performance indicator values, the data being based on feedback provided by customers when utilizing each of the different combinations of service types and specific services provided by specific third party providers associated with the services types with key performance indicators set to predetermined values;
determining, based at least in part on the customer engagement model, a customer satisfaction score associated with the service type, the specific services provided by specific third party providers and the associated key performance indicators;
when the customer satisfaction score is determined to be below a threshold, determining, from the network parameter information, one or more network parameters leading to the customer satisfaction score being below the threshold; and
adjusting the one or more of the network parameters to thereby increase the customer satisfaction score.

17. The non-transitory machine-readable storage medium according to claim 16, wherein in generating the model, the at least one code section causes the machine to perform acts of:
generating a plurality of network test cases, in which each test case specifies network parameters that include a network speed and a network latency;
consecutively setting test bed network parameters of a test bed network to the network parameters of each network test case;
for each test case, selecting a plurality of service types;
for each service type:
communicating, via the test bed network, content of the service type from a server to one or more customers;
adjusting a plurality of key performance indicators associated with the content; and
receiving, from the one or more customers, a customer satisfaction score that defines a quality of the content as perceived by the user.

18. The non-transitory machine-readable storage medium according to claim 17, wherein after the customer satisfaction scores associated with the plurality network test cases, the plurality of service types, the specific services provided by specific third party providers and the plurality of key performance indicators have been received, the at least one code section causes the machine to perform the act of determining a subset of key performance indicators having a highest correlation to the customer satisfaction score.

19. The non-transitory machine-readable storage medium according to claim 16, wherein in determining the one or more network parameters leading to the customer satisfaction score being below the threshold comprises, the at least one code section causes the machine to perform acts of:
storing, to a network optimizer database, data that relates a plurality of customer satisfaction scores, one or more service types, the specific services provided by specific third party providers and one or more combinations of network parameters;
selecting records of the network optimizer database related to the received service type and the specific services provided by specific third party providers that are related to a customer satisfaction score that is above the threshold;
comparing network parameters of the selected records with the received network parameter information to identify network parameter differences between one or more network parameters defined in the network parameter information and the network parameters specified in the selected records; and
determining that the network parameter differences lead to the customer satisfaction score being below the threshold.

20. The non-transitory machine-readable storage medium according to claim 16, wherein a service type corresponds to at least one of: a video streaming type of service and a web browsing type of service.

21. The non-transitory machine-readable storage medium according to claim 16, wherein the network parameter information defines one or more of: a cell name, a manufacturer of network equipment, a model of network equipment, a service provider associated with the network equipment model, an amount of memory required by the network equipment, and a computational power of the network equipment.

22. The non-transitory machine-readable storage medium according to claim 16, wherein the at least one code section causes the machine to perform the act of generating a map that illustrates customer satisfaction scores associated with different geographic regions.

* * * * *